(12) United States Patent
Johansson et al.

(10) Patent No.: US 9,003,540 B1
(45) Date of Patent: **\*Apr. 7, 2015**

(54) MITIGATING FORGERY FOR ACTIVE CONTENT

(75) Inventors: Jesper M. Johansson, Woodinville, WA (US); Eric J. Martin, Bainbridge Island, WA (US); Brandon M. Knight, Maple Valley, WA (US)

(73) Assignee: Amazon Technologies, Inc., Reno, NV (US)

( * ) Notice: Subject to any disclaimer, the term of this patent is extended or adjusted under 35 U.S.C. 154(b) by 587 days.

This patent is subject to a terminal disclaimer.

(21) Appl. No.: 12/575,393

(22) Filed: Oct. 7, 2009

(51) Int. Cl.
  *H04L 29/06* (2006.01)
  *H04L 9/32* (2006.01)

(52) U.S. Cl.
  CPC ........................................ *H04L 9/32* (2013.01)

(58) Field of Classification Search
  CPC ..................................................... G06F 21/10
  USPC .......................................................... 726/26
  See application file for complete search history.

(56) References Cited

U.S. PATENT DOCUMENTS

| | | | |
|---|---|---|---|
| 5,708,780 A * | 1/1998 | Levergood et al. | 709/229 |
| 6,266,773 B1 * | 7/2001 | Kisor et al. | 726/17 |
| 6,691,113 B1 * | 2/2004 | Harrison et al. | 1/1 |
| 7,743,153 B2 * | 6/2010 | Hall et al. | 709/227 |
| 8,051,465 B1 | 11/2011 | Martin et al. | |
| 8,180,891 B1 * | 5/2012 | Harrison | 709/224 |
| 8,505,106 B1 | 8/2013 | Bhosle et al. | |
| 8,510,813 B2 * | 8/2013 | Kumar et al. | 726/7 |
| 2003/0004874 A1 * | 1/2003 | Ludwig et al. | 705/40 |
| 2003/0208562 A1 * | 11/2003 | Hauck et al. | 709/219 |
| 2008/0115201 A1 * | 5/2008 | Sturms et al. | 726/9 |
| 2009/0271847 A1 | 10/2009 | Karjala et al. | |
| 2010/0251143 A1 * | 9/2010 | Thomas et al. | 715/760 |
| 2012/0030732 A1 | 2/2012 | Shaty | |
| 2012/0159177 A1 | 6/2012 | Bajaj et al. | |

OTHER PUBLICATIONS

Yee et al., "Native Client: A Sandbox for Portable, Untrusted x86 Native Code", May 2009, IEEE, pp. 79-83.*
Satoh et al., "Single Sign on Architecture with Dynamic Tokens", 2004, IEEE.*
U.S. Appl. No. 13/278,058, filed Oct. 20, 2011, Titled: Mitigating Forgery of Electronic Submissions.
U.S. Appl. No. 13/931,613, filed Jun. 28, 2013, Titled: Cross-site request Forgery Mitigation in Multi-Domain Integrations.

* cited by examiner

*Primary Examiner* — Mohammad L Rahman
(74) *Attorney, Agent, or Firm* — Kilpatrick Townsend & Stockton

(57) ABSTRACT

Cross Site Request Forgery (CSRF) and other types of fraudulent submission can be mitigated using state information that typically is already maintained for various users. Each submission requiring authentication can include a state identifier (ID). The state ID can be compared to a corresponding secure state ID stored in a secure location, such as in a secure token or cookie or in a variable on a page that can only be accessed by code executing in the same security context as the site to which the request is made. If the received state ID is valid and matches the secure state ID, the submission is processed. Otherwise, an interstitial element is generated to prompt the user to confirm the prior submission. A subsequent confirmation submission confirming the prior submission and containing the proper state ID can be processed. If no such confirmation is received, the submission is not processed.

25 Claims, 5 Drawing Sheets

MITIGATING FORGERY FOR ACTIVE CONTENT

BACKGROUND

As the number of users viewing information and purchasing items electronically increases, there is also an increasing amount of forgery, misuse of identity information, and other illicit activities in various electronic environments. Forced unauthorized commands or submissions from a trusted user of a Web site, for example, is often referred to as Cross Site Request Forgery (CSRF or XSRF). Typically, the submission is made to originate at the Internet protocol (IP) address of the user, such that the actual initiator of the submission is untraceable. The attacks often affect Web sites that use mechanisms such as state management, Web cookies, browser authentication, or client-side certificates to authenticate users. A CSRF exploit can, for example, be executed by tricking or otherwise causing a user to submit malicious data to a trusted Web site. The exploit typically originates at a malicious site, as a malicious payload in a file such as a hypertext markup language (HTML) or JavaScript file, which can contain script code triggering an action to be performed on a third-party site on behalf of the victim.

In an example where a user does banking electronically, a source such as an unauthorized third party could send a script to a user or client device that causes the user to submit a request to transfer money without the user's knowledge. Thus, a legitimate or authorized user can unknowingly submit a request to perform the transfer or another such operation as a result of the third party script.

In another example of a fraudulent submission, a user might login to an electronic marketplace that offers items for consumption, such as for purchase, rental, or download. An unauthorized script could cause a request to be submitted on behalf of the authorized user to purchase items, provide ratings, or perform any of a number of other such actions.

One conventional approach to mitigate CSRF attacks is to use the referrer header of a client request to determine whether the request is from the expected sender. While simple in complexity, the client application controls this aspect such that the referred header can be subject to spoofing by exploiting the application. In addition, some clients may omit the referrer header entirely in some circumstances. Therefore, this approach can't be relied upon with a great deal of confidence.

Another conventional approach to attempt to prevent processing of an unauthorized submission by a person or process posing as a trusted user is to generate a random number and digitally sign that number with a cryptographic key. The encrypted number is then sent to the user, for example, with the encrypted number being returned with each submission in order to verify that the request is coming from an authenticated user browsing the site. Such an approach comes with a significant amount of cryptographic processing overhead that is burdensome for many providers of electronic content, especially those of large scale and transaction volume.

BRIEF DESCRIPTION OF THE DRAWINGS

Various embodiments in accordance with the present disclosure will be described with reference to the drawings, in which.

DETAILED DESCRIPTION

Figure 1:
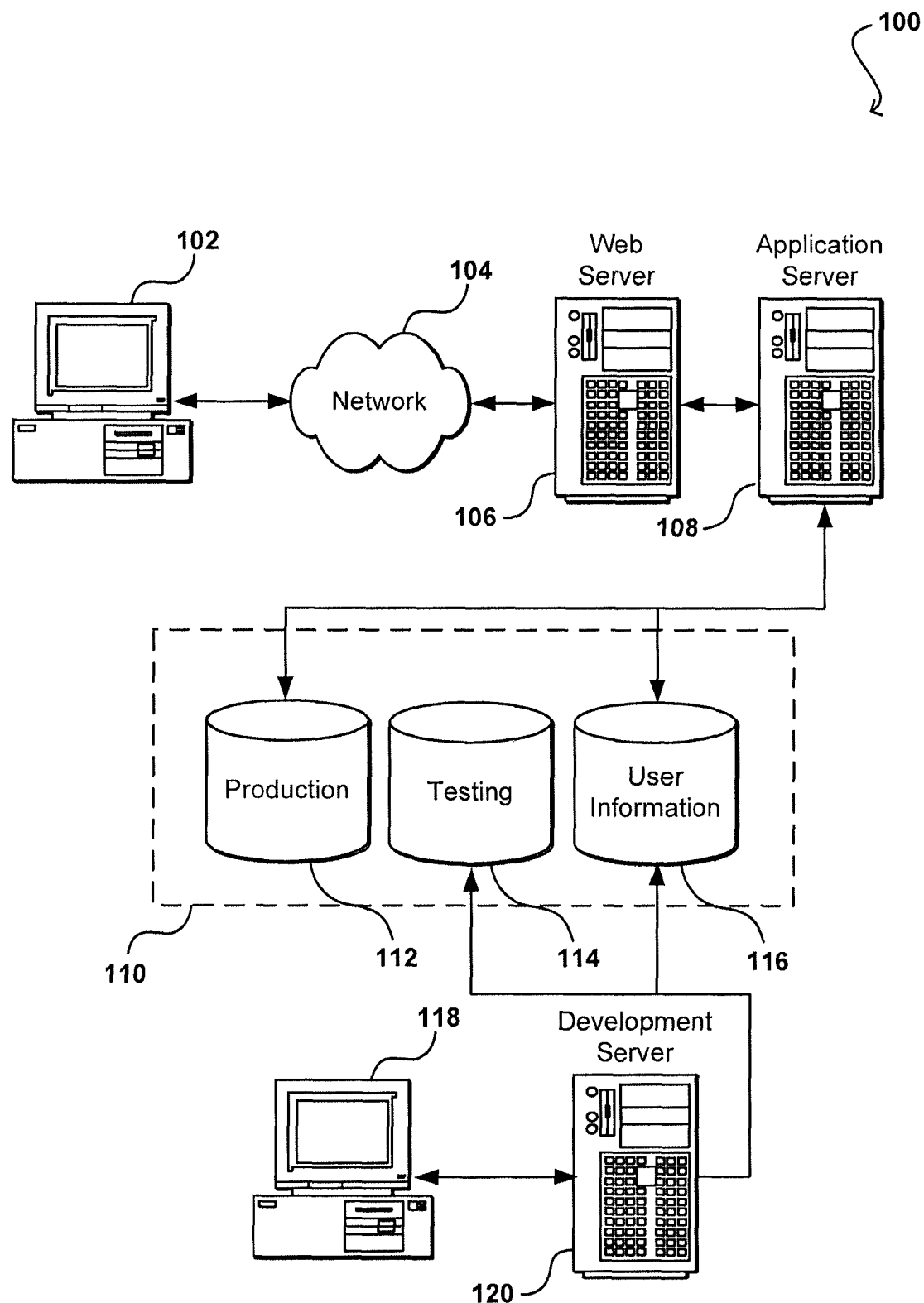
FIG. 1 illustrates an environment in which various embodiments can be implemented.

Systems and methods in accordance with various embodiments of the present disclosure may overcome one or more the aforementioned and other deficiencies experienced in conventional approaches to mitigating fraudulent, deceptive, or other unauthorized activity in an electronic environment. Systems and methods in accordance with various embodiments provide approaches for validating the source of a received submission utilizing information that is, in many cases, already available to trusted users. For example, session or state information is often maintained when a user accesses an application, page, site, or process across a network. In an Internet-based example, a user might have a session identifier ("ID") or other state identifier or state information generated by the accessed server when the user logs in to, or otherwise accesses or is authenticated to, a Web site, Web page, application, online game, etc. A session ID in one embodiment is a pseudo-random number, alphanumeric identifier, etc., which can be used as an index into a data store that contains session and/or state information for a user. A session ID generally is used to identify a user and associate that user with previous actions, provide a personalized experience, make purchase recommendations, etc.

In many cases, the session ID will be stored locally on a client device of the user, such as in a "cookie" (e.g., web cookie, HTTP cookie, etc.) or other such validation token for a browser, application, or interface on the client device. Generally, a "cookie" refers to a piece of text generated by a server and sent to a client application on a client device, which is stored locally on the client device and can be sent with any subsequent request from the client device back to that server, address, or other related location or device. Cookies can be used to store information such as user identification information, authentication information, session information, and user-specific information, such as personalization information, preference information, etc.

When a user logs in or is otherwise authenticated to a site, application, etc., a component such as a Web server can generate a session ID that is sent to the client device and stored in a cookie. The Web server can also store the session ID and other state or session information locally to the Web server, or on the "server side". In one example, all active session IDs are stored to a state table or data store on the server side. In this way, the session information can be determined for any request that is received by the Web server, such that the Web server or any other device or process on the server side can access related information for the user. The security of a user's session in such an embodiment is directly reliant upon the security of the cookie, such as a session tracking cookie, or other validation token storing the session ID or other validation information on the client device. If that token is compromised, security of the user's session is also compromised. Therefore, it is reasonable to base security decisions on such a token.

In other embodiments, the session ID or validation information can be stored as one or more variables inside a page, script, or other grouping of content or instructions. In some embodiments, a page that is viewable in a browser or similar application can be rendered in a "sandbox," or in a source-specific environment. Thus, certain portions of a page can only be accessed from the context (e.g., domain) associated with the origin or entity generating or otherwise providing the page of content. A session ID can be stored in any appropriate portion(s) of the page that are inaccessible to sources, domains, or other environments other than the source environment. When a user performs an action that causes a submission to be generated, the submission can include the session ID retrieved from that portion of the page that is inaccessible to an external environment. Further, in some embodiments the scripting on the page can be configured in a way such that the scripts cannot be executed from an external environment.

Systems and methods in accordance with various embodiments take advantage of the fact that state information can be stored at both the client and server sides to validate the source of any received submissions, and thus mitigate or otherwise reduce the number of fraudulent submissions that are received purporting to be submitted on behalf of an unknowing user. For example, a user visiting a malicious site can expose information that allows a fraudulent request to be submitted to a Web site on behalf of the user. If the request does not include the proper state information, however, a Web server or other such device or process can determine that there is something questionable or unusual about the request and can perform an action such as to prompt the user for confirmation using an interstitial page or other such process discussed herein.

While examples will be discussed generally with respect to Internet-based technologies, such as Web sites, client browsers, Web cookies, etc., it should be understood that advantages of the various embodiments can be obtained for any appropriate electronic environment wherein requests, messages, or other packets of electronic information are submitted from one address or location to another address or location, and it is possible for a person, device, or process to send such a packet of information in a way that makes it appear as if the packet came from a different source, user, etc.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple associates or other content providers might wish to offer users the opportunity to not only buy directly from the marketplace, but also to rate items, submit reviews, purchase items via an associate's site, etc. As discussed above, however, a provider such as an electronic marketplace typically will want some control over actions performed on behalf of a trusted user or customer. The electronic environment in such a case might include additional components and/or other arrangements, such as those illustrated in the configuration 200 of FIG. 2. In this example, devices such as a user client device 202 and a third party device 204 are able to access an entity 208 across a network 206. The "entity" as it will be referred to herein can include any appropriate combination of systems, services, devices, processes, and/or components for receiving requests across the network and serving responses in response thereto. Such an entity might provide a Web site or electronic marketplace, for example, or could in some embodiments include an enterprise application, a company's electronic presence, a database application, etc., as discussed elsewhere herein. Further, while the present embodiment is discussed with respect to an electronic marketplace, it should be apparent to one of ordinary skill in the art in light of the teachings and suggestions contained herein that advantages and aspects of the various embodiments can be used with any of a variety of other such entities, sites, providers, etc., such as may include online banking sites, electronic or online gaming, content providers, electronic auction sites, and similar endeavors.

In this example, the entity 208 includes at least one server 210, such as a Web server or application server, able to receive requests from across the network 206. While described with respect to a network such as the Internet, it should be appreciated that this also could be an intranet or local area network (LAN), for example. The server in this example communicates with a script or page generator 216 that is able to access information in any appropriate data store, such as a user data store 218 or session data store 214, and generate information to be sent to a client device for display. The entity can include a data manager 220 that is able to manage data such as user data, item data, production data, etc., and store that data to at least one data store such as the user data store 218. The entity in this example also includes a session manager 212 able to manage session information for any user, process, request, etc., and store that session information to the session data store 214. While these components are shown as separate components, it should be understood that components such as the session manger, page generator, and data manager can be separate or common applications or processes running on a single device or multiple devices, and that information such as the user data and session data can be stored in separate data stores, as separate tables in a single data store, across a distributed data system, etc. Such an entity typically will include additional components and processes known in the art for such environments, and can include any of a number of variations within the scope of the various embodiments.

In various embodiments, the page generator 216 can generate code or script that is programmed to execute on the client device 202, such as in a browser application. For example, code can be delivered to the client that is written using asynchronous JavaScript and XML, commonly referred to as AJAX, which enables client-side scripting or interactive applications to be executed on the client device 202. Using client-side scripting technology, applications can submit requests to an entity 208 or other such source without submitting an HTML form or other such submission that result in the generation of a new page for the client. Thus, a user can interact with elements on a page without having to re-render the page, wait for code for the new page to download, etc. The scripting language can provide a seamless interaction with "server-side" components that can occur in the background, often without the user being aware that a request or submission is generated. Oftentimes, a response can be received that causes an element on the page to update or change using the scripting language, without having to load and/or render a new page. For example, if a user selects a rating for an item, the user can see the rating for the item displayed on the page without the page being reloaded, etc., and the rating can be submitted to a remote entity, for example, without any indication of the submission to the user. It should be understood that various scripting languages and client-side scripting techniques can be used, and that the requests do not have to be asynchronous in all embodiments.

When a client-side script is executing on a client in an application such as a browser, for example, the script can function as an application that is able to send requests to a Web site, domain, or other such source, and receive responses from that source. In many cases, an application such as a browser can enforce "same origin" or similar technology for such applications, whereby only components or entities having the same origin or context (e.g., domain) can access, execute, and/or interact with the scripting language. This is sometimes referred to as "sandboxing" the script, where the script can only interact or "play" with other components or scripts residing in the same context, or in the same "sandbox." Typically, the script will be sourced from a particular entity, domain, set of servers, etc. The script can be pushed or pulled to the browser, which can execute the script in the context in which the script was sourced. When the script makes a request to the source entity, such as may be in response to a user performing a specific action with respect to a page or other rendering of content, a response can be returned that includes a session identifier (ID) or other such validation token once a validation, authentication, or similar process is executed by the entity or a component or service in communication therewith. The session ID then can be included in subsequent requests from the scripting language, such that a validation or similar process does not have to be re-executed for each subsequent request.

Potential problems exist, however, in that a malicious or unauthorized third party or entity can utilize a script source link or other such mechanism to obtain a script from the source in such a way that the script will execute in the context of the third party, and not in the context of the source. For example, a hacker website could download or otherwise obtain a script for an electronic marketplace that could potentially execute in the domain of the hacker website. If the script receives a valid session ID in a response from the origin entity, that session ID can be utilized by the unauthorized third party. The third party (e.g., a script of a third party website) can then generate and send submissions to the origin entity that appear to be authenticated, etc., as the submission contains a valid session ID and the entity is typically unaware of the context in which the script was executed. Such an approach could be used by a third party or other such entity to send requests to the origin entity, such as to a website of the origin domain, and execute any task that could be performed if the script was actually sourced from the original context.

In the example wherein an authenticated user is able to submit a review or rating for an item offered through an electronic marketplace, the user can have the ability to select a rating designation (e.g., select a number of stars to give the item), which will cause a submission to be generated (such as via JavaScript or a similar scripting language) and sent to a server for the electronic marketplace, which can store and/or process the rating information. The submission can include the session ID, such that the server can quickly determine that the submission is from an authenticated source. If a third party obtains the session ID, the third party could potentially generate submissions that include the session ID and thus could submit ratings or other information that would appear to come from the authorized source.

While the submission of fraudulent reviews might not be of major concern to various entities, client-side scripting and similar technologies are increasingly being used to provide differing functionality in additional contexts. Thus, the tasks that can be performed and information that can be obtained likely will become increasingly more sensitive over time. For example, a user might be able to transfer funds between bank accounts using such scripts and submissions, such that a third party obtaining a valid session ID could potentially transfer funds to a third party account, etc.

Systems and methods in accordance with various embodiments can address these and other such issues by storing a session ID, validator, secure state information, token, or other such authorization element in a location that cannot be accessed from outside the context of the origin of the authorization element. In some embodiments, the session ID or token is stored in a cookie that, via a browser or other such application, can only be accessed by scripts executing in the context of the origin. Third party scripts, or even scripts from the origin source, will not be able to access the information in the cookie if those scripts are running in a context other than the origin context.

In other embodiments, the session ID or secure token can be stored in a variable on the page itself, or in the code or script being executed on the client device, but in a location that cannot be accessed from a context other than the origin context. The variable thus is only accessible to scripts, sites, components, applications, etc., operating in the origin context. The variable cannot be placed in any location on a page or in code, however, as certain portions can reside in different security contexts, and thus could be exposed to third parties. The location of the variable can depend upon the technology, language, script, application, etc., but should be placed in a location that is protected within the sandbox. For client-side applications or other such script that is not protected by a browser sandbox or other such context-based approach, modifications may be needed to ensure that the variables, cookies, or other such tokens or validators are not exposed to third parties.

In some embodiments, specific ground rules or policies can be applied in order to ensure that the session ID or other such validation information is kept secure. For example, a rule can be specified that causes a server of the entity or other such device to remove any session ID or other such validator from any response sent to the client that could potentially be intercepted by a third party, third party script, etc. Various rules also can be applied that determine how the validation token ("validator") is initially obtained at the client device, how the validator is included in a request so as to not be intercepted by a third party script, and other such aspects. For example, a session ID might only be able to be transmitted to a client device in a context that would not expose the information to a different domain. This can include specific communications, specific locations in those communications (e.g., not in an client-side scripting page, such as contains only JavaScript or VBScript), etc. Further, different rules can apply to different technologies. For example, an element presented in Flash® format (available from Adobe Systems Incorporated) can store a validator in a location that cannot be accessed from a third party context (i.e., when operating in a browser the element can rely upon the browser sandboxing ability), where that element might generate submissions and/or receive responses from an entity across a network, etc. If a third party obtains a script, client-side application, etc., but is operating in a third party context, the script or application will attempt to obtain information that is not available in that context, such that any submission from the third party context will fail. Any technology that enforces a "same-origin" technology (e.g., sandbox) can have such mitigation applied.

Figure 2:
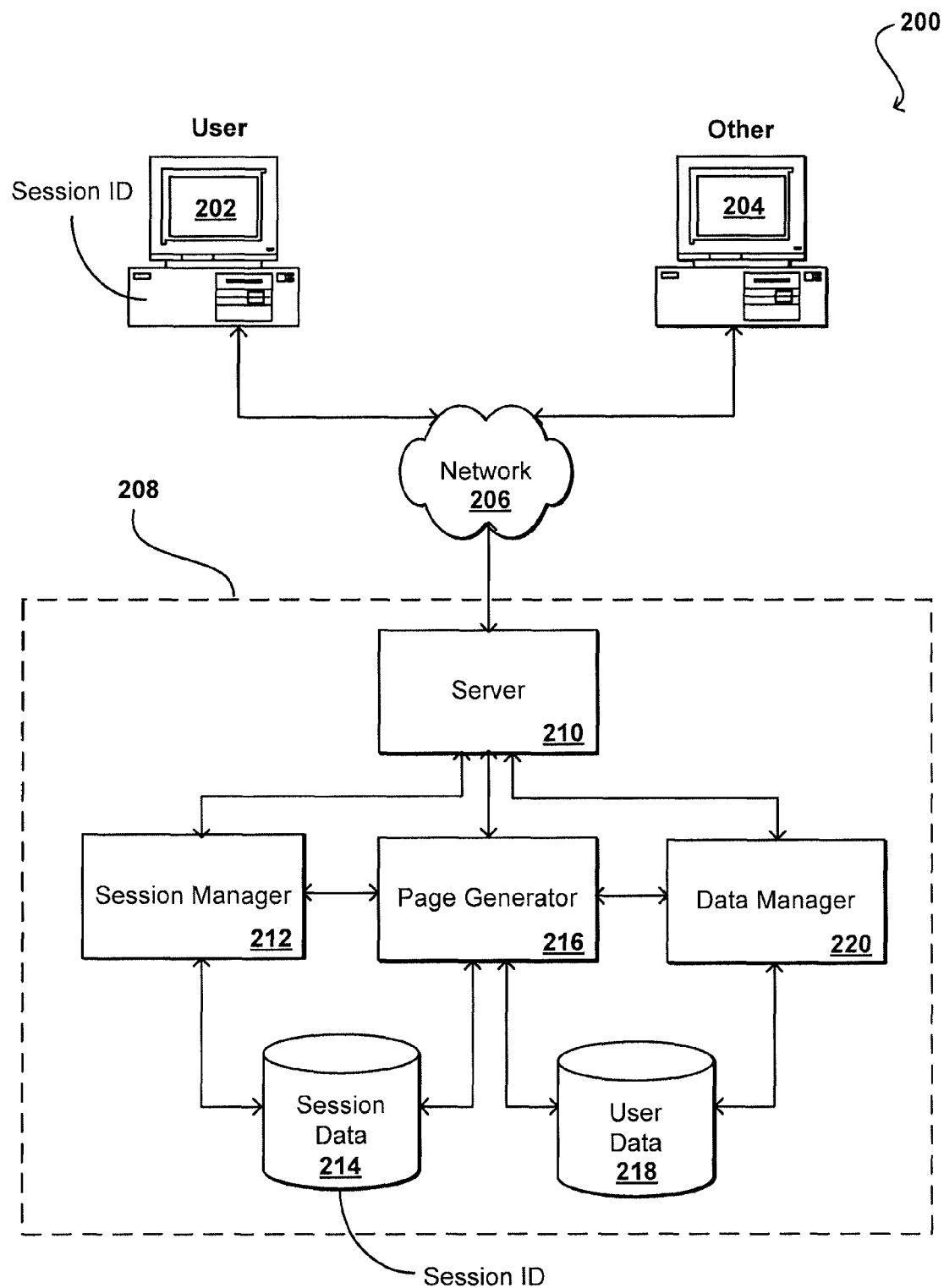
FIG. 2 illustrates components for analyzing submissions that can be used in accordance with one embodiment.
Figure 3:
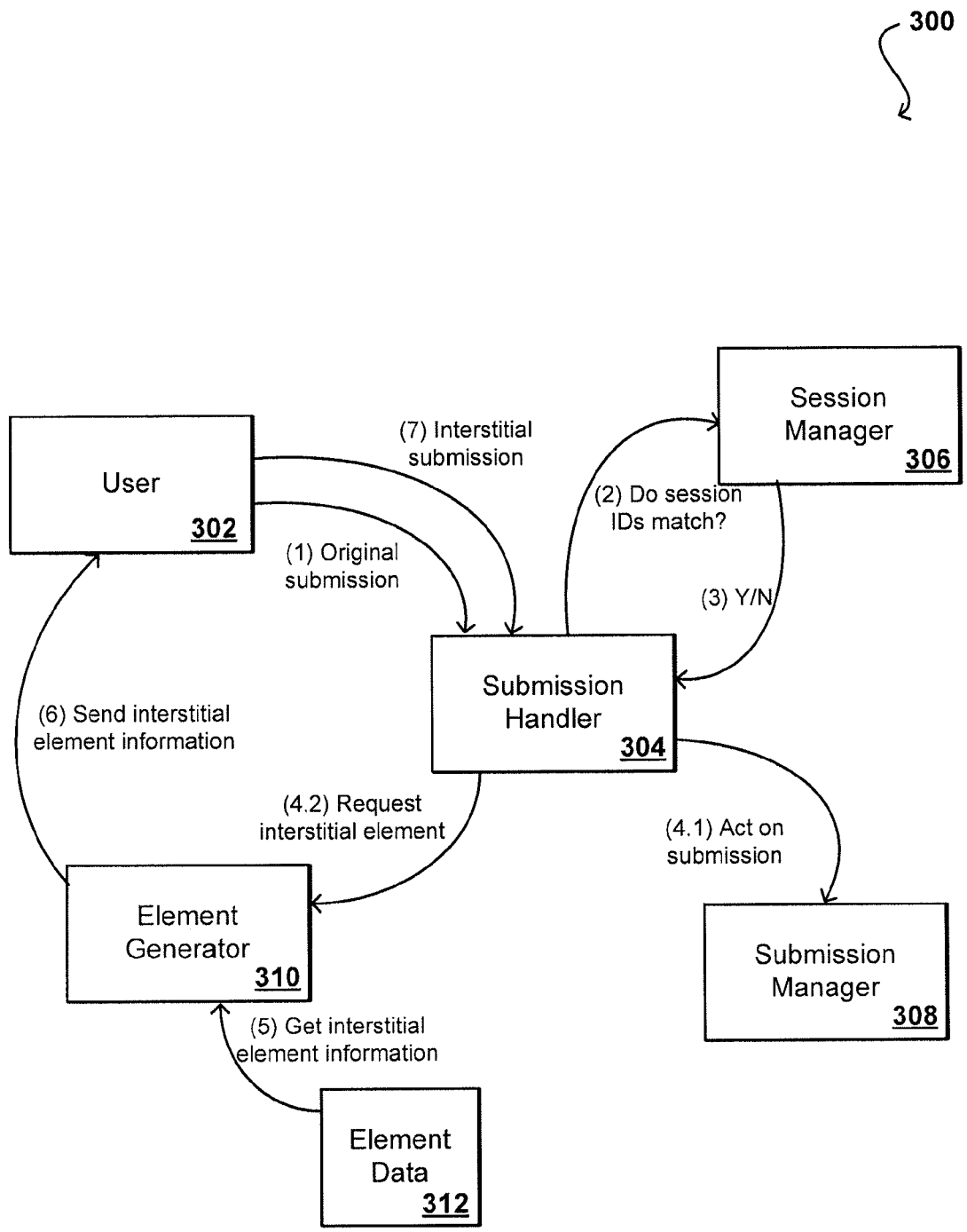
FIG. 3 illustrates a state diagram for a process that can be used in accordance with one embodiment.

FIG. 3 illustrates a state diagram 300 showing various states of operation of an example entity such as that described with respect to FIG. 2. This example assumes that a user or client device 302 has accessed a page of information or other content element that has been provided at some point in the past by the page generator 310 or a similar component or process. In many cases, a token will have been transmitted to the user or otherwise caused to be generated on the user device. If the user is authenticated to the system, a secure token can be transmitted to the user and stored in a secure fashion in a cookie or other such location, as discussed herein. The user at some point causes a request or other packet of information to be submitted by performing an action, such as "clicking" a user-selectable element on a page. In this case, as shown at event (1), the request is sent as an original or initial submission from the user. When this original submission is received, information from the submission can be directed to a component such as a submission handler 304, which can be part of the Web server or another appropriate device or process. The submission handler may handle its own processing or may pass the processing off to other components. In one embodiment, the submission handler is solely responsible for implementing session ID validation to ensure that malicious requests are detected. The submission handler can receive raw, "un-trusted" user data and perform input validation on that data before further processing can take place. The submission handler also can receive a copy of the secure token from the user, either as part of the submission or as a separate submission. The secure token can be transmitted as part of a cookie, as described in the various embodiments herein, or by using any other appropriate mechanism known in the art.

The submission handler 304 can examine the submission to determine whether a session ID (or similar state identifier as discussed herein) is included in the submission, and whether that session ID matches the session ID received in the secure token. If the user has an authentication cookie for the origin domain then the cookie can be contained in an HTTP/HTTPS header. All data in such a submission can be considered un-trusted and un-validated until validated.

If the submission includes a session ID, and corresponding session or state information also has been received in a token for the user, the submission handler 304 at event (2) passes the session IDs and any other appropriate information to a session manager 306, which determines whether the session IDs match, as well as whether the matching IDs correspond to a stored session ID that is still active and valid. The session manager 306 at event (3) returns a response to the submission handler 304 indicating whether the session IDs from the submission and the token match, and whether those IDs correspond to an active session ID stored for the user associated with the request. If the session IDs match and the session ID is active, then information for the request is passed on to a submission manager 308 or similar component in order to act on the submission, at event (4.1), such as to process the request, etc.

If the submission does not include a session ID, the session ID included in the submission does not match the session ID submitted in a cookie, or if the session ID in the cookie is not matched to a current session, then the submission handler can pass information for the submission to an element generator 310 or similar component, at event (4.2), requesting that an "interstitial" element or other such response be generated and sent to the user. As referred to herein, an interstitial element refers to any page, display, message, or other set of electronic information sent to a user that requires some action by a user before a previous submission can be processed. In many embodiments this will involve sending information to a browser of a user wherein the user must view or interact with an element, such as a modal window or popup element, and generate submit another submission confirming that the user generated the previous submission. In other embodiments, this can include sending an email message, text message, instant message, or other appropriate communication informing the user that another action is required to process the previous submission. For example, an email message might be sent to a user including a link that the user must follow to confirm the previous submission, or in some cases might simply instruct the user to reply to the message where the reply response can include the session ID. Extra care can be taken to ensure that no information relating to the session ID or other validator is exposed to a third party context.

When the element generator 310 receives the request for an interstitial element, the element generator at event (5) can access an element template 312 or other appropriate mechanism useful for generating the interstitial element or causing the client device to generate the interstitial element. In some cases there might be several templates available that can be used, depending upon the type of submission that was received. In other cases, there might only be a single template available but a variety of text or other elements that can be used depending on the type of submission. Information from the submission also can be used with such a template in order to provide a sufficient amount of information for the user to confirm or deny the previous submission. For example, if the previous submission indicated that the user wished to purchase one-hundred televisions, the page generator can select an appropriate template for a purchase request, and can generate text to include in the element that asks whether the user intended to purchase one-hundred televisions. If the user did not have a valid session ID previously, a valid session ID can be generated for the client device.

Once the information for the interstitial element is generated, the information is sent to the address of the user or client device 302 at event (6) to be rendered or otherwise conveyed to the user. As discussed, in several embodiments the interstitial element will take the form of a modal window or popup element being displayed in a browser application on the user device. When the interstitial element is displayed to the user, the user can verify that the user intended for the previous submission to be performed or, alternatively, deny (e.g., refuse to resubmit) the previous submission. If the user indicates that the user did not initiate the previous submission, or that the submission is otherwise improper, the information for the previous request can be discarded.

In a case where the original submission was initiated by a malicious script utilizing JavaScript or other hidden client side code, for example, it is unlikely that the user will ever receive and/or view the interstitial element. The submission for the interstitial element thus can be sent using a "fire and forget" type approach, whereby no information is stored for the interstitial element, and the information can be sent again in any subsequent submission. Unless the malicious code chooses to surface the interstitial element to the intended victim, that element will simply be lost and the initial submission discarded.

If the user instead selects an option to verify that the previous submission was proper and was initiated by, or on behalf of, the user, another submission (an "interstitial submission") can be generated and sent back to the system at event (7) to be processed by the submission handler 304. The session ID stored on the user device is included in the interstitial submission. If there is no session ID information for the user, such as where the session ID expired before the user initiated the interstitial submission, the submission will fail again. If necessary, this may require the user to log back into the system or otherwise be re-authenticated. The submission handler 304 then can receive the information for the interstitial submission and can process that information as if the information was for an original submission, such as by validating and matching session IDs and either passing the information to a submission manager at event (4.1) or requesting another interstitial element at event (4.2). In this example, each submission will either result in the information being passed to a submission manager for action, or the issuance of an interstitial element. If no matching session ID is found, the process can continue to loop until the person attempting to make a fraudulent request finally gives up or a termination action occurs. In some embodiments, a number of tries can be allowed before the process stops and the original request is denied. Since such approaches can involve tracking additional state information for each user, such approaches may not be optimal in all situations.

Figure 4:
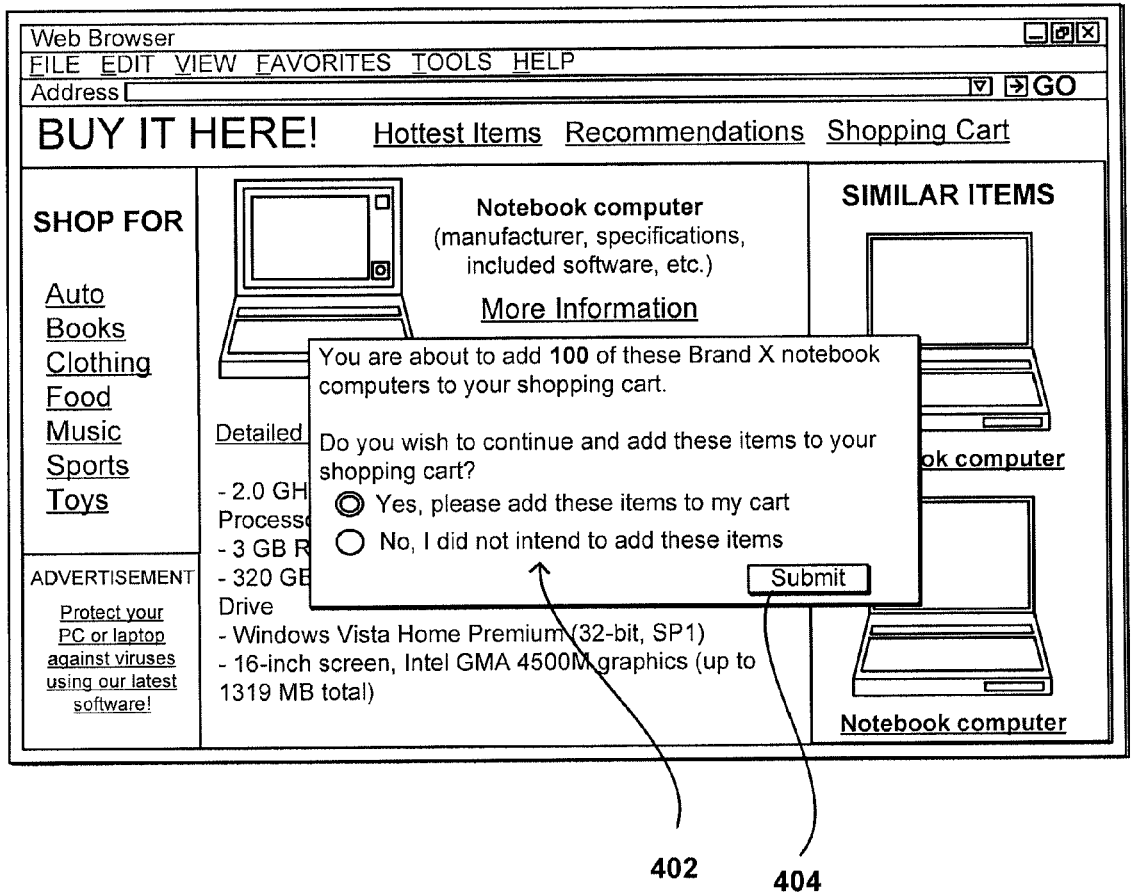
FIG. 4 illustrates an example of an interstitial element that can be displayed in accordance with one embodiment.

FIG. 4 illustrates an example of an interstitial element 400 that can be displayed to the user. In this example, a message is displayed to the user in a modal window indicating that a request was received to purchase items on behalf of the user, in this case one-hundred notebook computers. The interstitial element can include any other appropriate information, such as information about the items allegedly being purchased, related items or information, etc. The interstitial element also can include at least one user-selectable option or element 402 allowing the user to indicate whether the user initiated this request, and/or an element 404 used to submit the indication.

This example includes radio buttons and a submit button, but many other or alternative elements can be used as would be apparent to one of ordinary skill in the art in light of the teachings and suggestions contained herein, such as a single confirmation button, yes/no buttons, separate hypertext links to confirm or deny, alert dialogs, etc. As discussed, information such as a session ID and information from the previous request can be included the interstitial submission so that the request information can be processed if the session IDs now match.

Figure 5:
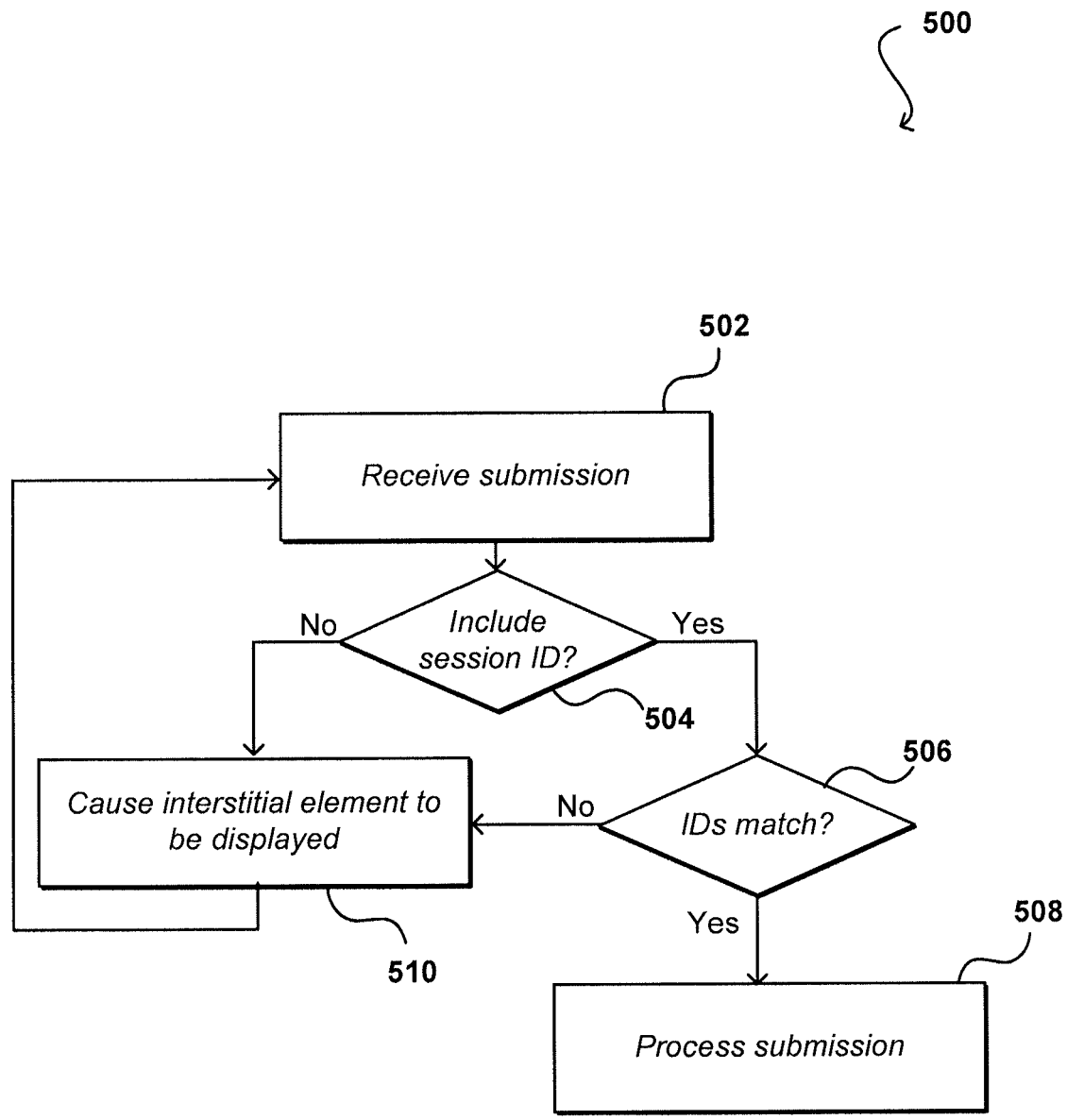
FIG. 5 illustrates a process for analyzing submissions that can be used in accordance with one embodiment.

To provide a more general understanding, FIG. 5 illustrates steps of a process 500 for validating the source of a request using session information that can be used in accordance with various embodiments. In this example, an initial submission is received that includes information identifying the submission as being sent on behalf of a user 502. A determination is made as to whether the submission contains a valid and active session ID 504. As discussed, a session ID is merely an example, and any appropriate identifying information or token can be used as discussed elsewhere herein. If the submission includes a session ID, a determination is made as to whether the included session ID matches a session ID received in a secure token for the user, and whether the session ID also corresponds to an active session ID stored by the system for that user 506. If the session ID of the submission matches the session ID of the cookie and is determined to be an active session ID for that user, the submission is processed 508. If the submission did not include a session ID, the included session ID did not match a session ID in a secure token received from the user, or the session ID is not valid and active, then an interstitial element is generated to enable the user to confirm (or deny) the previous submission 510. The process then can continue, with each subsequent submission being analyzed for a valid and matching session ID until a valid and matching session ID is included in one of the submissions. It also should be pointed out that if a user denies that the initial submission came from the user, the submission including the denial can include the session ID information, and processing the submission can include deleting any information relating to the submission, or storing the information for purposes of investigating fraudulent activities, etc.

While the embodiments discussed above have related generally to tracking session information in cookies and hidden fields for a Web site such as an electronic marketplace, it should be understood that various other embodiments can include, function with, and/or address other such functionality. For example, an entity can add state validation functionality for any page, site, submission, request, etc., where an authenticated identity of the user is of importance. Any such page viewed by a user can require that any state ID present in a token or elsewhere on the client device is submitted with a request or other submission. While this can take the form of a hidden field in some embodiments, other approaches can be used as well, such as appending the state information to a uniform resource locator (URL), placing the information in a header of the request, etc. When the submission is received, a determination can be made based on the type of submission, information included in the submission, etc., to determine whether to verify a state ID before processing that submission.

A system in accordance with one embodiment also can utilize multiple session IDs. A recognition session ID might be used to track non-critical information, such as user viewing preferences, general geographic information used to display relevant content, etc. A recognition session ID might not expire, at least for an extended period of time, and might not be stored in a secure cookie. An authentication session ID might be used to verify the identity of the user, and might be stored in a secure cookie or other secure location. In this case, the authentication ID would typically be used with the submission handler and session manager to validate the source of a request, as the authentication session ID is handled securely and typically would only be valid for a relatively short period of time. Authentication session IDs can be required for processes such as purchasing items, transferring money, etc. Any submission sending an authentication session ID also can be required (e.g., by setting a cookie as secure) to be sent over a secure connection in at least some embodiments, such as a connection using a secure sockets layer (SSL) or similar secure communications protocol. Alternatively, the same session ID can be used for both authenticated and recognized scenarios, but marked on the server to indicate which the session ID represents.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a langauge such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP (including IPv4, IPv6 and all protocols of the general suite of protocols included in TCP/IP), OSI-appropriate protocols, UPnP, NFS, CIFS, SONET, SDH, ATM, Frame Relay, MPLS, and AppleTalk. The network can be, for example, a local area network, a wide-area network, a virtual private network, the Internet, an intranet, an extranet, a public switched telephone network, a satellite network, a cellular network (including GSM TDMA and CDMA), an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as ASP, ASPX, JSP, PHP, Perl, Python, or TCL, as well as combinations thereof. The server(s) may also include database servers, including without limitation those commercially available from Oracle®, Microsoft®, Sybase®, IBM®, and Sun®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for authenticating a source of a submission, comprising:
   receiving, by a first computer system, an initial submission corresponding to a source;
   receiving, from a second computer system different from the first computer system, a first secure token corresponding to the source, the first secure token including a secure state identifier, the secure state identifier being stored at the source such that the secure state identifier is only accessible within a security context through which the secure state identifier was issued;
   determining, by the first computer system, whether the initial submission includes a received state identifier that corresponds to the secure state identifier received in the first secure token;
   if the initial submission includes a received state identifier that corresponds to the secure state identifier, and the received state identifier is determined to correspond to an active state for the source, processing the initial submission;
   if the initial submission does not include a received state identifier that corresponds to both the secure state identifier and an active state for the source:
     causing an interstitial element to be displayed, the interstitial element including information from the initial submission and including at least one user-selectable element allowing for confirmation of the source of the initial submission through generation of an interstitial submission; and
     if the interstitial submission is received confirming the source of the initial transmission and including the active state identifier, and the active state identifier matches the secure state identifier, processing the interstitial submission.

2. The computer-implemented method of claim 1, wherein the security context through which the secure state identifier was issued comprises a network domain.

3. The computer-implemented method of claim 1, wherein the secure state identifier is stored in at least one of a cookie at the source or in a variable on a page rendered at the source.

4. The computer-implemented method of claim 1, wherein the initial submission is generated by a script executing at the source.

5. A computer-implemented method for authenticating a source of a submission, comprising:
   causing, by an identifier provider that is implemented by a computer system, a secure state identifier to be stored at the source in a provider-specific sandbox such that the secure state identifier is only accessible by the identifier provider within the provider-specific sandbox through which the secure state identifier was caused to be stored at the source;
   causing, by the identifier provider, a received state identifier to be included in each submission received from the source when the source has previously received the received state identifier in response to an authentication of the source; and processing, by the identifier provider, only initial submissions that originate via the provider specific sandbox and include the received state identifier that matches the secure state identifier.

6. The computer-implemented method of claim 5, further comprising:

providing a script capable of being executed at the source to generate the submission, the script configured to execute in the provider-specific sandbox whereby the received state identifier is only able to be determined by the script when the script is executing at the source in the provider-specific sandbox through which the secure state identifier was caused to be stored at the source.

7. The computer-implemented method of claim 6, wherein the provider-specific sandbox through which the secure state identifier was issued comprises a network domain.

8. The computer-implemented method of claim 5, wherein the secure state identifier is stored in at least one of a cookie at the source or in a variable on a page rendered at the source.

9. The computer-implemented method of claim 5, further comprising:

determining whether the received state identifier corresponds to an active state identifier stored for the source.

10. The computer-implemented method of claim 5, further comprising:

generating the active state identifier upon an initial validation of the source.

11. The computer-implemented method of claim 5, wherein:

the state identifier is a random number.

12. The computer-implemented method of claim 5, wherein:

the state identifier expires after a period of inactivity.

13. The computer-implemented method of claim 5, further comprising:

for submissions that do not include a received state identifier that matches the secure state identifier, causing an interstitial element to be displayed enabling confirmation of the source of the submission through generation of an interstitial submission; and processing only interstitial submissions that include a received state identifier that matches the secure state identifier for the source.

14. The computer-implemented method of claim 13, further comprising:

if the interstitial submission is received confirming the source of the initial transmission, and the interstitial submission does not include the active state identifier that matches the secure state identifier, causing a subsequent interstitial element to be displayed.

15. The computer-implemented method according to claim 13, further comprising:

generating the interstitial element using at least one of an element template or information corresponding to the initial submission.

16. The computer-implemented method according to claim 13, wherein:

the interstitial element further enables a denial of the source of the submission through generation of an interstitial submission.

17. The computer-implemented method according to claim 5, further comprising:

requiring a re-authentication of the source when the state identifier is no longer active.

18. The computer-implemented method according to claim 5, further comprising:

sending any communication including the state identifier using a secure communications protocol.

19. A system for authenticating a source of a submission in an electronic environment, comprising:

a processor; and a memory device including instructions that, when executed by the processor, cause the processor to:

cause, by one or more servers of the system, a secure state identifier to be stored at the source in a server-specific security environment such that the secure state identifier is only accessible by the one or more servers within the server-specific security environment through which the secure state identifier was caused to be stored at the source;

cause a received state identifier to be included in each submission received from the source when the source has previously received the received state identifier in response to an authentication of the source;

process only initial submissions that include the received state identifier that matches the secure state identifier when the received state identifier is received via the server-specific security environment; and if the initial submissions that include the state identifier received via the server-specific security environment does not match the secure state identifier:

provide an interstitial element to the source of the submission, the interstitial element including information from the initial submissions and including at least one user-selectable element allowing for confirmation of the source of the submission.

20. The system of claim 19, wherein the instructions when executed further cause the processor to:

provide a script capable of being executed at the source to generate the submission, the script configured to execute in the server-specific security environment whereby the received state identifier is only able to be determined by the script when the script is executing at the source in the server-specific security environment through which the secure state identifier was caused to be stored at the source.

21. The system of claim 19, wherein the secure state identifier is stored in at least one of a cookie at the source or in a variable on a page rendered at the source.

22. A non-transitory computer-readable storage medium including instructions for authenticating a source of a submission in an electronic environment, the instructions when executed causing a computer system to:

cause a secure state identifier to be stored at the source in an identifier-provided security environment such that the secure state identifier is only accessible within the identifier-provided security environment through which the secure state identifier was caused to be stored at the source;

cause a received state identifier to be included in each submission received from the source when the source has previously received the received state identifier in response to an authentication of the source;

process only initial submissions that include the received state identifier that matches the secure state identifier when the received state identifier is received via the identifier-provided security environment; and if the initial submissions that include the state identifier received via the identifier-provided security environment does not match the secure state identifier:

provide an interstitial element to the source of the submission, the interstitial element including information from the initial submissions and including at least one user-selectable element allowing for confirmation of the source of the submission.

23. The non-transitory computer-readable storage medium of claim 22, wherein the instructions when executed further cause the computer system to:

provide a script capable of being executed at the source to generate the submission, the script configured to execute in identifier-provided security environment whereby the received state identifier is only able to be determined by the script when the script is executing at the source in the identifier-provided security environment through which the secure state identifier was caused to be stored at the source.

24. The non-transitory computer-readable storage medium of claim 22, wherein the secure state identifier is stored in at least one of a cookie at the source or in a variable on a page rendered at the source.

25. The computer-implemented method of claim 5, wherein the provider-specific sandbox includes at least a secure environment that can only be accessed from a context corresponding to the identifier provider.

* * * * *